Aug. 25, 1953 C. F. BALL 2,649,979
TIMBER SETTING MACHINE
Filed Nov. 20, 1948 8 Sheets-Sheet 3

Inventor:
Charles F. Ball.
by Charles F. Osgood,
Attorney.

Aug. 25, 1953    C. F. BALL    2,649,979
TIMBER SETTING MACHINE
Filed Nov. 20, 1948    8 Sheets-Sheet 4

Inventor:
Charles F. Ball.
by Charles Osgood,
Attorney.

Aug. 25, 1953 — C. F. BALL — 2,649,979
TIMBER SETTING MACHINE
Filed Nov. 20, 1948 — 8 Sheets-Sheet 6

Inventor:
Charles F. Ball.
by Charles F. Osgood,
Attorney.

Aug. 25, 1953  C. F. BALL  2,649,979
TIMBER SETTING MACHINE
Filed Nov. 20, 1948  8 Sheets-Sheet 6

Inventor:
Charles F. Ball.
by Charles F. Osgood.
Attorney.

Patented Aug. 25, 1953

2,649,979

UNITED STATES PATENT OFFICE 2,649,979

TIMBER SETTING MACHINE

Charles F. Ball, Franklin, Pa., assignor to Joy Manufacturing Company, Pittsburgh, Pa., a corporation of Pennsylvania Application November 20, 1948, Serial No. 61,177

28 Claims. (Cl. 214—77)

This invention relates to timber setting machines, and more particularly to an improved machine for setting mine timbering elements, such as horizontal cross timbers or beams, against the roof of an underground mine or tunnel.

In underground mines or tunnels, it is the usual practice to set horizontal cross timbers or beams against the roof as the work advances to support the roof against falls or cave-ins, and the cross timbers or beams are held in position by upright timbers or props, or by rib pinnings. When rib pinnings are employed the holes for the pins are drilled in the ribs near the roof by a separate drilling apparatus, and the cross timber or beam is then usually manually lifted into place against the roof and held there as the rib pins are driven into the holes to secure the cross timber in place. In known instances, timber setting machines have been provided for transporting the mine timbering elements about the mine or tunnel and for setting the cross timbers in place against the roof. The present invention contemplates improvements over such known machines in that the means for transporting the mine timbering elements and for setting the cross timbers in place against the roof and for drilling the pin holes in the ribs are embodied in a unitary machine whereby the several functions may be performed mechanically with comparatively little effort on the part of the operator and his helpers. The machine of the present invention is adapted to travel over uneven floor surfaces and embodies a platform for carrying a load of timbers together with a mechanical lifting device for receiving the timbers from the platform and for lifting the timbers from a position near the platform level to an elevated position wherein the timbers may be moved endwise along a boom-type elevator onto the timber receiving saddle, and when the timber is properly positioned on the saddle the elevator may be swung upwardly to place the timber against the roof. Moreover, in the machine of the present invention, the pivoted elevator boom which carries the saddle may be swung horizontally about an upright axis on the base of the machine, and may be shifted rectilinearly in a horizontal direction so that the cross timber may be readily placed at the desired location against the roof. Also in the machine of the present invention, the steering and traction means for the machine embodies independently driven crawler treads and steering wheels providing an extremely flexible mounting for the machine, enabling travel of the machine over an uneven floor surface and steering of the machine about the sharp curves and in the relatively restricted spaces encountered in an underground mine or tunnel. Further, in the machine of the present invention, a drilling apparatus is associated with the timber elevator boom and embodies a drilling tool which is adjustably mounted on the boom whereby the pin holes may be readily drilled at the desired location in the ribs, and the cross timbers may be quickly moved up by the boom against the roof and firmly held there during driving of the rib pins in the drilled holes, thereby making the task of timber setting relatively easy and minimizing the danger. Separate control means are also provided for certain of the operations of the machine whereby control may be effected at different stations on the machine either when the operator is riding on the machine or is standing at one side of the machine.

It is an object of the present invention to provide an improved timber setting machine. Another object is to provide an improved timber setting machine embodying means for drilling the pin holes in the ribs together with elevator means for elevating and positioning the cross timber and for firmly holding the cross timber against the roof during setting of the roof pins. A further object is to provide an improved timber setting machine having improved means for transporting a load of mine timbering elements about the mine or tunnel and for elevating and positioning the cross timbers and for holding the timbers up against the roof during the setting operation. A still further object is to provide an improved timber setting machine having an improved timber lifting device for receiving the cross timbers from the machine platform and for raising the timbers from their transport position on the machine to a position wherein they may be readily moved endwise along the timber elevator onto the timber receiving saddle. Yet another object is to provide an improved guiding and directing means for guiding and directing a cross timber as it is moved endwise onto the elevator saddle thereby minimizing the need of manually bodily lifting the timbers. Still another object is to provide an improved timber setting machine embodying a swingable boom type elevator which carries the timber receiving saddle, together with novel means for horizontally positioning the saddle supported by the elevator as the timber is raised into position against the roof. A further object is to provide improved traction and steering means for a timber setting machine. Yet another object is to provide an improved timber setting machine having a swingable boom type elevator mounted on a horizontally slidable support carried by a turntable mounted on the base of the machine whereby a timber supported on the saddle of the elevator may be readily adjusted through a relatively wide range, thereby to facilitate positioning of the timber with respect to the roof. Another object is to provide an improved drilling apparatus mounted on the elevator of the timber setting machine and having a novel adjustable mounting for the drilling tool whereby the latter may be quickly adjusted into the desired drilling position. A further object is to provide an improved timber setting machine having a crawler type traction and steering means at one end and rubber tired steering wheels at the opposite end whereby steering of the machine is made more flexible, enabling the machine not only to be sharply turned, but also to be moved in a rectilinear path diagonally to its length. Yet another object is to provide an improved power operated lifting device for elevating the timbers with respect to the load receiving platform of the machine, together with improved power operated devices for elevating the timber supporting frame of the device. Another object is to provide an improved timber lifting device which is normally disposed in its lowered position with its upper surface substantially flush with the load receiving platform or deck of the machine whereby a timber may be easily moved laterally thereon and which may be raised a substantial distance above the deck level. A still further object is to provide an improved timber setting machine having adjustable platforms mounted on the machine base in a novel manner and on which the workmen may stand both during drilling and setting of the roof timbers. Still another object is to provide improved separate controls for certain of the operations of the machine whereby control may be readily effected at different stations on the machine while the operator is riding on the machine or is standing at one side of the machine. These and other objects and advantages of the invention will, however, hereinafter more fully appear.

In the accompanying drawings there is shown for purposes of illustration one form which the invention may assume in practice.

In these drawings.

In the illustrative embodiment of the invention, as shown in the drawings, the improved timber setting machine is generally designated 1 and generally comprises a mobile base 2 having a frame 3 mounted at one end, herein its forward end, on a crawler device 4 and at its opposite end, herein its rear end, on rubber tired wheels 5. Supported at the front end of the base frame above the crawler device 4 is a turntable 6 carrying a horizontal sliding support 7 on which a pivoted elevator boom 8 is mounted to swing in vertical planes with respect to the sliding support and turntable. Carried at the outer end of the elevator is a timber receiving saddle 9. Arranged centrally lengthwise of the base frame rearwardly of the elevator and turntable is a timber lifting device 10, and pivotally mounted at the sides of the base frame are platforms 11 on which the workmen may conveniently stand during drilling and setting of the cross timbers. Carried beneath the elevator boom 8 is a drilling apparatus 12 for drilling the holes in the ribs for receiving the rib pins. Stabilizer jacks 13 are engageable with the floor rearwardly of the crawler device 4 for steadying the machine during the drilling and timber setting operations. An electric motor 14 drives a pump 15 for supplying liquid under pressure to the various hydraulically operated devices of the machine. Electric motors 16, 16 drive the treads of the crawler device. A conventional electric cable reel 17, and arranged at the rear end of the base frame, serves to conduct electric power to the motors 14 and 16.

Figure 5:
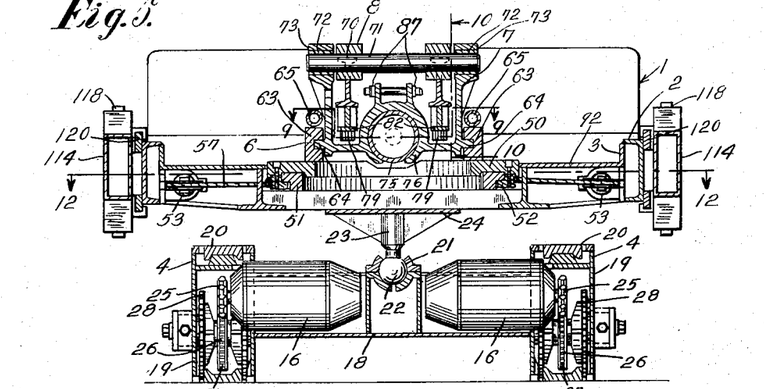
Fig. 5 is an enlarged cross sectional view taken substantially on line 5—5 of Fig. 2.

The front crawler device 4 comprises a frame 18 having side frame portions 19 about which endless crawler treads 20 are guided for circulation. Formed centrally of the crawler frame is a spherical socket 21 for receiving a ball-like member 22, the latter secured to an upright post 23 secured to a horizontal plate 24 in turn secured to the base frame. The ball and socket mounting thus provided enables universal tilting of the crawler device relative to the base frame to permit the machine readily to traverse an uneven floor surface. Carried by the tread frame are the electric motors 16 which are herein arranged in transverse alinement, as shown in Fig. 5, at the opposite sides of the ball and socket mounting. The motors may be operatively connected to the treads in various known manners and herein desirably each motor has a sprocket 25 secured to its power shaft and connected by an endless drive chain 26 arranged within its associated tread frame portion 19 and engaging a sprocket 27 which is fixed to a double sprocket 28. The sprockets 28 engage and drive the endless crawler treads 20 and are journaled on bearings supported by horizontal shafts 29. The shafts are arranged transversely of the tread frame portions 19 and are mounted at their ends in sliding blocks 30 guided in longitudinal guideways 31 and adjustable by screws 32 for varying the position of the tread driving sprockets 28. The endless crawler treads pass around guide sprockets 33 similarly adjustably mounted on the tread frame portions, and by the provision of these adjustable sprocket mountings the tension of the crawler tread chains may be varied as desired.

Figures 10, 11:
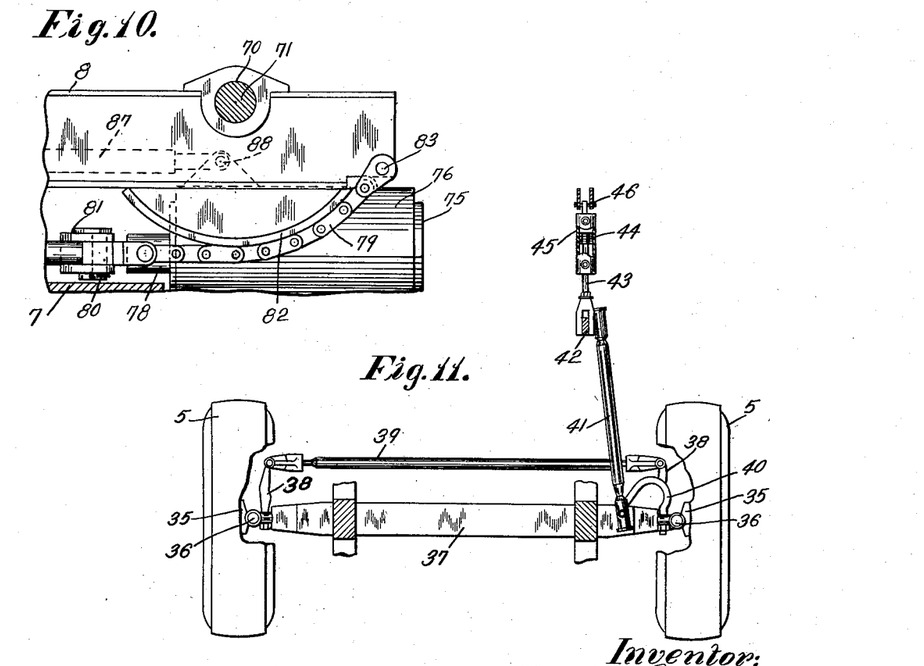
Fig. 10 is a detail vertical sectional view taken on line 10—10 of Fig. 5.
Fig. 11 is a fragmentary detail view showing the rear wheels and the associated steering gear.

The rear wheels 5, as shown in Fig. 11, are journaled on axles 35 which are swivelled at 36 on upright axes on the ends of a transverse axle 37 extending beneath the bottom of and secured to the base frame. The axles 35 have arms 38 secured thereto and connected together by a cross rod 39 in a conventional manner. An arm 40 is pivotally connected to a usual drag link 41 which is in turn pivotally connected to the lower end of a lever 42 (see Figs. 2 and 4). The lever 42 is pivotally mounted on a transverse axis at its upper end on the base frame to swing in vertical planes, and has pivotally connected thereto between its ends a piston rod 43 secured to a reciprocable piston 44 contained in a hydraulic cylinder 45. The cylinder 45 is pivotally mounted on a parallel axis at 46 on a bracket secured to the base frame to swing in vertical planes. When liquid under pressure is supplied to the cylinder 45 to effect movement of the piston the rear wheels 5 may be swung horizontally in unison to effect steering in one direction or the other. Normally, liquid is trapped in the cylinder 45 to lock the piston in a stationary position, thereby to hold the wheels 5 in parallelism with the longitudinal dimension of the base frame, and steering is effected by these wheels only under special circumstances, to be later explained. The control valve means for the cylinder 45 will be later described.

Figure 12:
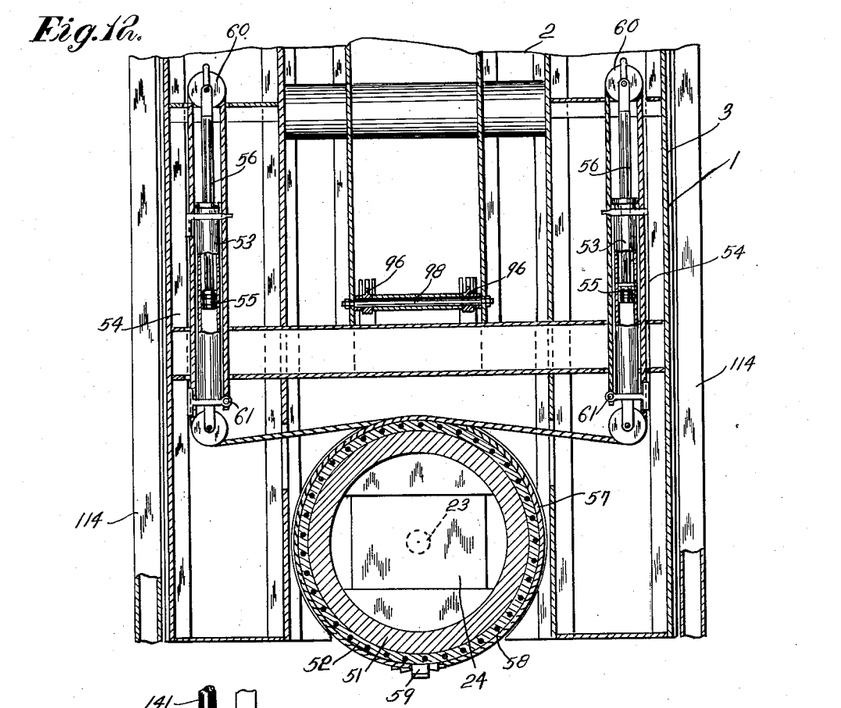
Fig. 12 is a horizontal sectional view taken substantially on line 12—12 of Fig. 5, showing the turning mechanism for the turntable.
Figure 13:
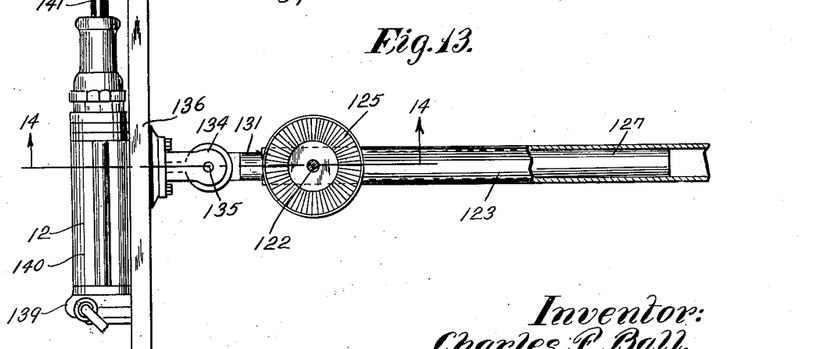
Fig. 13 is a horizontal sectional view, with parts in full, taken substantially on line 13—13 of Fig. 3 and showing the drill mounting.

Now referring to the mounting for the turntable 6, it will be noted that the turntable frame 50 is generally in the form of an annulus, and is rotatably mounted on a bearing ring 51 secured to the base frame. A retaining ring 52 is secured, as by screws, to the turntable frame to hold the latter in position on its bearing mounting on the bearing ring. The means for turning the turntable comprises a pair of hydraulic cylinders 53 arranged in parallelism lengthwise of the base frame and secured to longitudinally extending side frame members 54 of the base frame, as shown in Fig. 12. These cylinders contain reciprocable pistons 55 having their piston rods 56 extending rearwardly through the packed rear cylinder heads. A cable 57 passes around peripheral guiding groove 58 on the retaining ring 52 and is secured, as by a clamp 59, midway between its ends to the retaining ring. The opposite end portions of the cable extend longitudinally from the opposite sides of the retaining ring groove and pass around guide sheaves 60 carried at the rear ends of the piston rods 56, and the end portions of the cable extend forwardly and are fixed at their extremities at 61 to the front cylinder heads. When liquid under pressure is suitably supplied to the cylinders 53, the pistons 55 and guide sheaves 60 are moved to effect tightening of one end portion of the cable while concurrently paying out the other cable portion to turn the turntable in the desired direction. Liquid trapped in the cylinders 53 serves to lock the pistons against movement, thereby to hold the turntable in its adjusted position. The control valve means for the cylinders 53 will be hereinafter described.

Figure 9:
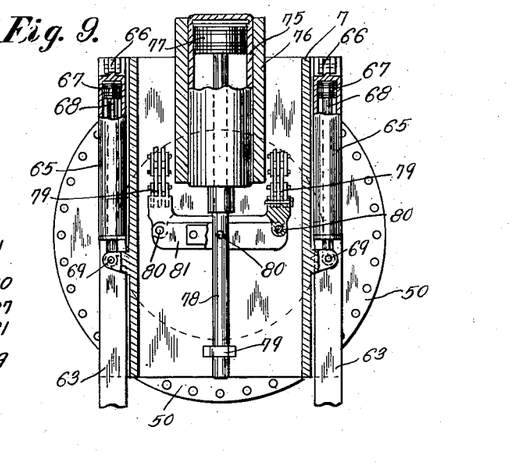
Fig. 9 is a horizontal sectional view taken substantially on line 9—9 of Fig. 5.

In accordance with the present invention, the turntable frame is provided with parallel horizontal guideways 63 spaced equidistantly from its center and in which guides 64 integral with the sliding support 7 are slidably guided. Hydraulic cylinders 65 pivoted at 66 to swing in vertical planes are arranged at the opposite sides of the turntable, as shown in Figs. 5 and 9, and these cylinders contain reciprocable pistons 67 having piston rods 68 extending forwardly through the front cylinder heads. These piston rods are pivotally secured at 69 to lugs integral with the sliding support 7. By pivoting the cylinders so that they may swing slightly up and down as the sliding support is moved rectilinearly along its guideways, binding of the parts is avoided. When liquid under pressure is suitably supplied to the cylinders 65 the sliding support 7 may be moved horizontally back and forth along its guideways relative to the turntable. The control valve means for the cylinders 65 will be later described.

The elevator boom or pivoted boom frame 8 is secured at 70 to a horizontal transversely disposed shaft 71 which is pivotally mounted above the turntable with its ends journaled in bearings 72 supported by upstanding brackets 73 integral with the sliding support 7 (see Fig. 5). Thus the elevator boom 8 may swing in vertical planes relative to the sliding support and turntable. The boom frame is elongated and extends outwardly beyond the adjacent end of the base and carries the saddle 9 at its outer extremity. Supported at the top of the elevator boom are transverse guide rollers 74 spaced lengthwise of the boom frame, in the manner shown. The boom frame may be swung in vertical planes upwardly on its pivotal mounting by a hydraulic cylinder 75 mounted in a cylindrical support 76 secured to the top of the sliding support 7. The cylinder 75 is arranged centrally between the cylinders 65 in parallelism therewith (Figs. 5 and 9), and reciprocable in the cylinder 75 is a piston 77 having its piston rod 78 extending forwardly through the packed front cylinder head. The forward portion of the piston rod is slidingly received in a guide 79 carried by the sliding support, and pivotally connected to the piston rod at 80 is a cross frame or equalizer yoke 81 swingable in horizontal planes and having flexible chain sections 79 attached at 80 to its ends. These chain sections pass around curved segmental guides 82 secured to the boom frame and are attached at 83 to the rearward end of the boom frame. When liquid under pressure is supplied to the rear end of the cylinder 75 the piston 77 is moved forwardly to swing the boom frame upwardly about its pivot to elevate the timber receiving saddle 9, and when liquid is vented from the cylinder the boom frame may swing downwardly by gravity at a controlled rate. The control valve means for the cylinder 75 will be described later on.

In this illustrative construction, the timber receiving saddle 9 has a bottom frame 85 pivotally mounted at 86 on the outer extremity of the boom frame, and extending longitudinally within the boom frame are rods 87 which are pivotally connected at their rear ends at 88 to upstanding lugs formed integral with the cylinder support 76, and these rods are pivotally connected at their front ends at 89 to the saddle base frame 85. The four pivots of the boom frame and rods are equally spaced at the corners of a rectangle, and the boom frame and rods cooperate to provide a parallel motion arrangement whereby the saddle frame is maintained horizontal irrespective of the angular position of the boom frame. The structure of the saddle per se may be similar to that fully disclosed in my copending application, Ser. No. 24,534, filed May 1, 1948, and includes a timber receiving platform 90. Application Serial No. 24,534 has now matured into Patent No. 2,574,857, patented November 13, 1951.

Figures 3, 4:
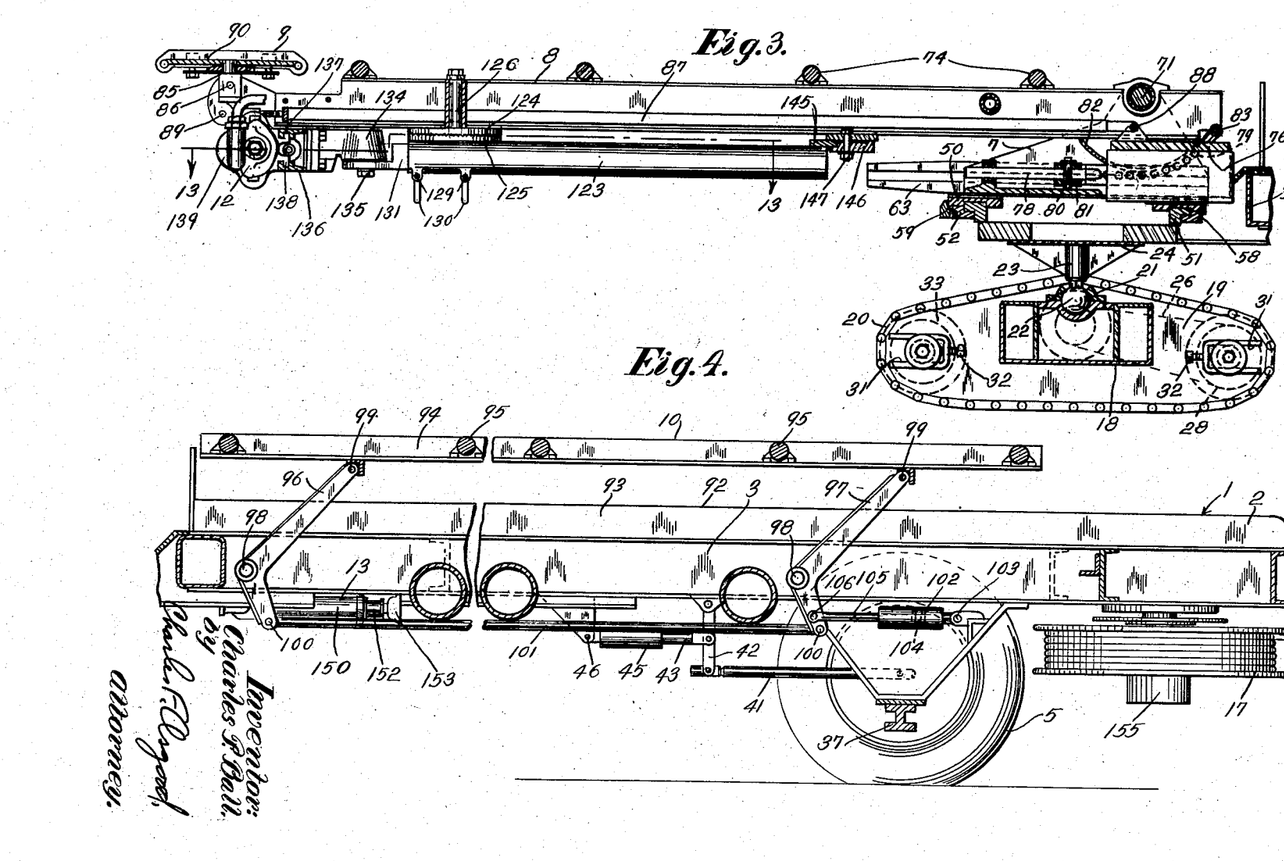
Fig. 3 is an enlarged view in longitudinal vertical section taken substantially on line 3—3 of Fig. 1, and with parts shown in full to facilitate illustration.
Fig. 4 is an enlarged view in longitudinal vertical section taken substantially on line 4—4 of Fig. 1.
Figure 6:
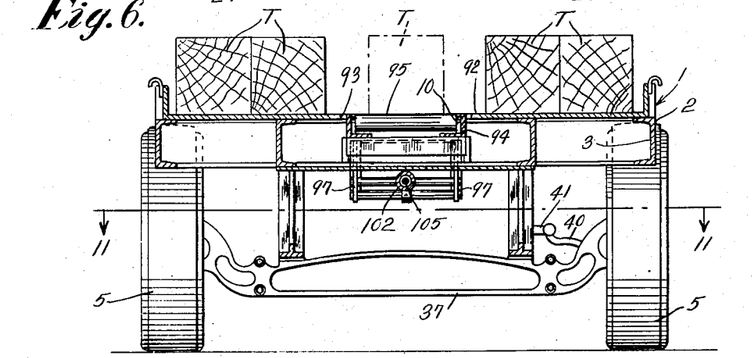
Fig. 6 is an enlarged cross sectional view taken substantially on line 6—6 of Fig. 2, with the timber lifting device in lowered position.
Figure 7:
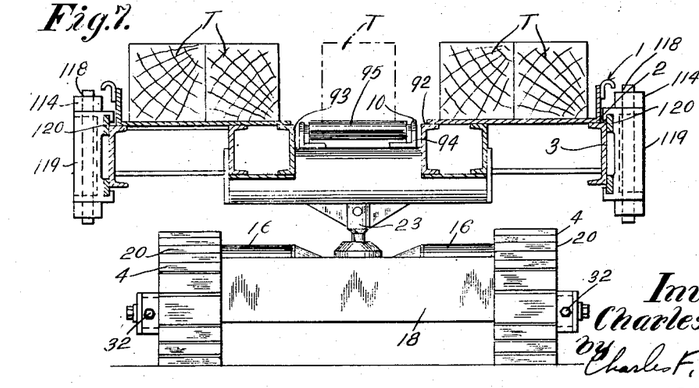
Fig. 7 is an enlarged cross sectional view taken substantially on line 7—7 of Fig. 1, with the timber lifting device in lowered position.
Figure 8:
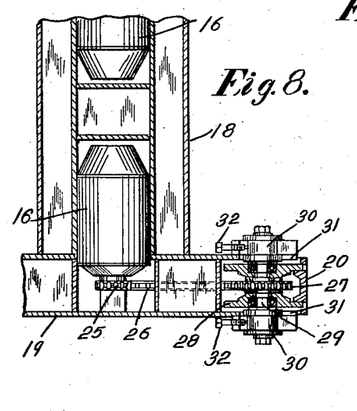
Fig. 8 is an enlarged horizontal sectional view taken substantially on lines 8—8 of Fig. 2.

The timber lifting device 10 is arranged centrally lengthwise of the base frame rearwardly of the turntable and timber elevator boom, and the base frame has an upper timber carrying platform or deck 92 which is longitudinally recessed or formed with a chamber at 93 to receive the lifting device when the latter is lowered, as shown in Figs. 6 and 7. This lifting device comprises an upper horizontal carrier frame 94 supporting a series of transverse guide rollers 95 spaced lengthwise of the upper frame, as clearly shown in Figs. 1 and 4. Pairs of lever arms 96 and 97 in the form of bell cranks are pivotally mounted on transverse axes at 98 on the base frame, and these lever arms at their upper ends are pivotally connected at 99 to the opposite end portions of the upper frame 94. The lower ends of the lever arms are pivotally connected at 100 to a longitudinally disposed actuating rod 101 which ties the pairs of front and rear levers together to swing in unison. A hydraulic cylinder 102 (Fig. 4) is pivotally mounted on a transverse axis at 103 on the base frame and contains a reciprocable piston 104 having its piston rod 105 extending outwardly through the cylinder head, and this piston rod is pivotally connected at 106 on a parallel axis to the rearward lever arms 97. When liquid under pressure is suitably supplied to the cylinder, the piston is moved to swing the lever arms upwardly about their pivots, thereby to move the upper roller frame 94 outwardly and forwardly into its raised position, as shown in Fig. 4. When liquid is vented from the cylinder 102 the upper roller frame may be lowered at a controlled rate. The control valve means for the cylinder 102 will be hereinafter described.

In this improved construction, the platforms 11 have supporting frames 110 formed with vertically spaced collars 111 which are slidably adjustably mounted on vertical posts 112, which are in turn vertically adjustable in bosses 113 integral with horizontal arms 114. Set screws 115 threaded within the bosses 113 are releasable to permit lowering of the posts to bring their lower ends into supported engagement with the floor surface, and these set screws, when tightened, firmly clamp the posts in adjusted position. The platforms may be adjusted vertically along the posts to vary their elevation, and set screws 116 threaded in the upper collars serve to clamp the platforms firmly in adjusted position. Also, by loosening the set screws 116 the platforms may be swung horizontally about the vertical axes of the posts in an obvious manner. The horizontal arms 114 are pivotally mounted at 118 on sliding supports 119 to swing in horizontal planes so that the platforms may be adjusted into different lateral positions with respect to the base of the machine. The sliding supports 119 are slidably guided on guideways 120 extending longitudinally along the sides of the base frame for movement longitudinally relative to the base to enable adjustment of the platforms forwardly and rearwardly with respect to the base. The swinging arms 114 and the sliding supports 119, as the result of friction due to the weight of the structure, tend to remain in their positions of adjustment, but if desired suitable clamps such as set screws (not shown) may be provided to secure them firmly in adjusted position.

Figure 14:
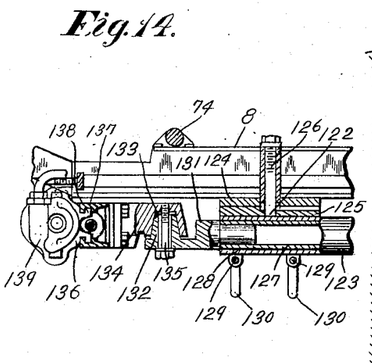
Fig. 14 is a detail sectional view, with parts in full, taken on line 14—14 of Fig. 13.

Now referring to the drilling apparatus 12, it will be noted that, swivelled at 122 on the bottom of the pivoted boom frame 8 to swing laterally relative to the latter, is an elongated tubular guide support 123. The swivel for the tubular support includes an upper circular plate 124 (Fig. 14) secured to the boom frame 8 and a cooperating circular lower plate 125 secured to the tubular support 123, and the adjacent faces of these plates are serrated so that when the plates are clamped together by a central clamping bolt 126 the parts are firmly locked in position. Slidably and rotatably guided in the tubular support 123 is an elongated tubular guide 127, and this guide may be clamped in adjusted position as by a split clamp 128 having tightening screws 129 operated by handles 130. Secured to the outer end of the tubular guide 127 is a support 131 having a conical portion 132 which is received in a conical socket 133 formed in a swingable supporting arm 134. A screw 135 arranged centrally of the conical portion and socket serves, when tightened, to clamp the supporting arm 134 in its different angular positions with respect to the guide support 131. The supporting arm 134 is secured, as by screws, to a guide shell 136 which has longitudinal guideways 137 for slidingly receiving guides 138 on a drilling tool 139. This drilling tool may assume various forms, but is herein desirably of the pressure fluid actuated hammer type, and includes a hammer motor 140 for delivering impact blows to a drill steel 141 which carries a conventional drill bit 142. A reversible fluid actuated feeding motor 143, mounted at the rear end of the guide shell, serves, through a conventional feed screw and feed nut type feeding mechanism (not shown) to feed the drilling tool back and forth along the shell guideways. From the foregoing, it will be evident that by loosening the bolt 126 the drilling tool may be swung laterally into different positions with respect to the boom frame, and may be bodily rotated about the longitudinal axis of the guide support 123. Also by loosening the screw 135, the drilling tool may be swung laterally relative to its guide support. Thus a relatively wide range of tool adjustment is afforded, and when the parts are in the desired adjusted position and are clamped therein, the drilling tool may be firmly supported in its drilling positions at either side of the elevator boom. When the tubular guide support is in its position wherein it extends longitudinally of the boom frame, as shown in Fig. 3, a plate 145 secured to the rear end of the guide support engages a clamp 146 having a tightening bolt 147, and when the clamp-bolt is tightened the plate 145 is firmly gripped to hold the guide support in position. The drilling apparatus above described is being claimed in my divisional application Serial No. 234,627, filed June 30, 1951.

The floor engaging jacks 13 comprise hydraulic cylinders 150 pivotally mounted at their upper ends at the sides of the base frame beneath the latter to swing in vertical planes about transverse axes, and these cylinders contain reciprocable pistons 151 having their piston rods 152 extending downwardly through the lower cylinder heads. Carried at the lower ends of the piston rods are floor engaging members 153. When the jacks are swung downwardly into the position shown in Fig. 2, and liquid under pressure is suitably supplied to the cylinders, the members 153 may be raised or lowered, as desired. The control valve means for these cylinders will be later described. When the floor jacks are not in use they may be swung up out of the way, as shown in Fig. 4, and suitably held in position.

The cable reel 17 may be driven by a suitable hydraulic motor 155, and may have conventional control means whereby, when the timber setting machine is propelled forwardly into the mine passageway or tunnel, the electric conductor cable wound on the cable reel may be drawn off of the reel while maintained under the desired tension. When the timber setting machine is propelled rearwardly the cable reel is driven by this motor at the desired cable winding speed. Since the particular structure of this reel does not enter into the present invention, further description thereof is herein unnecessary.

The motor driven pump 15 is adapted to supply liquid under pressure to the various hydraulically operated devices above described, and a control valve mechanism, as will soon be described in detail, is provided for controlling the flow of liquid under pressure relative to the hydraulic cylinders of the devices. Also, the motors 14 and 16 are provided with conventional electrical control apparatus. Since such electrical control apparatus is conventional and well known, detailed description and illustration thereof are omitted.

Figure 1:
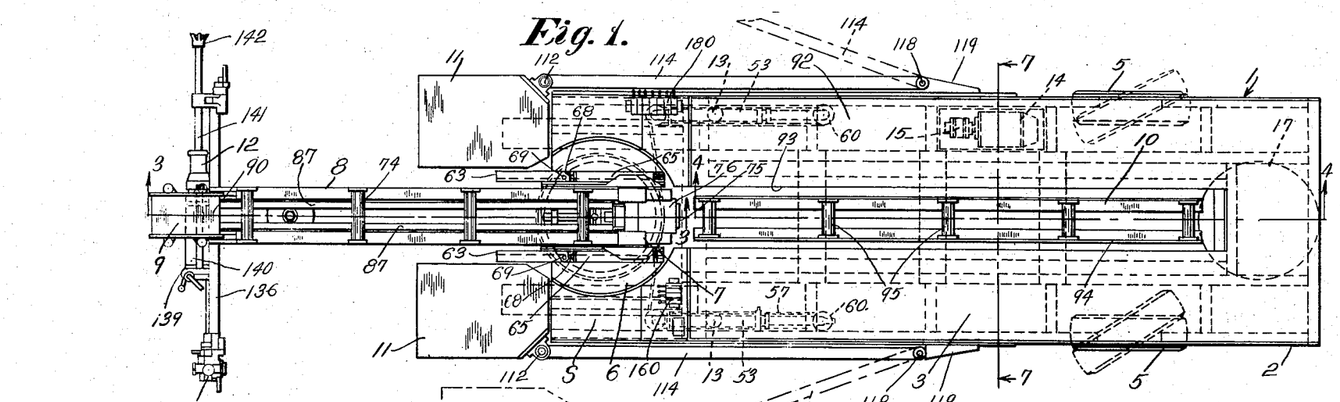
Fig. 1 is a plan view of a timber setting machine constructed in accordance with an illustrative embodiment of the invention.
Figure 15:
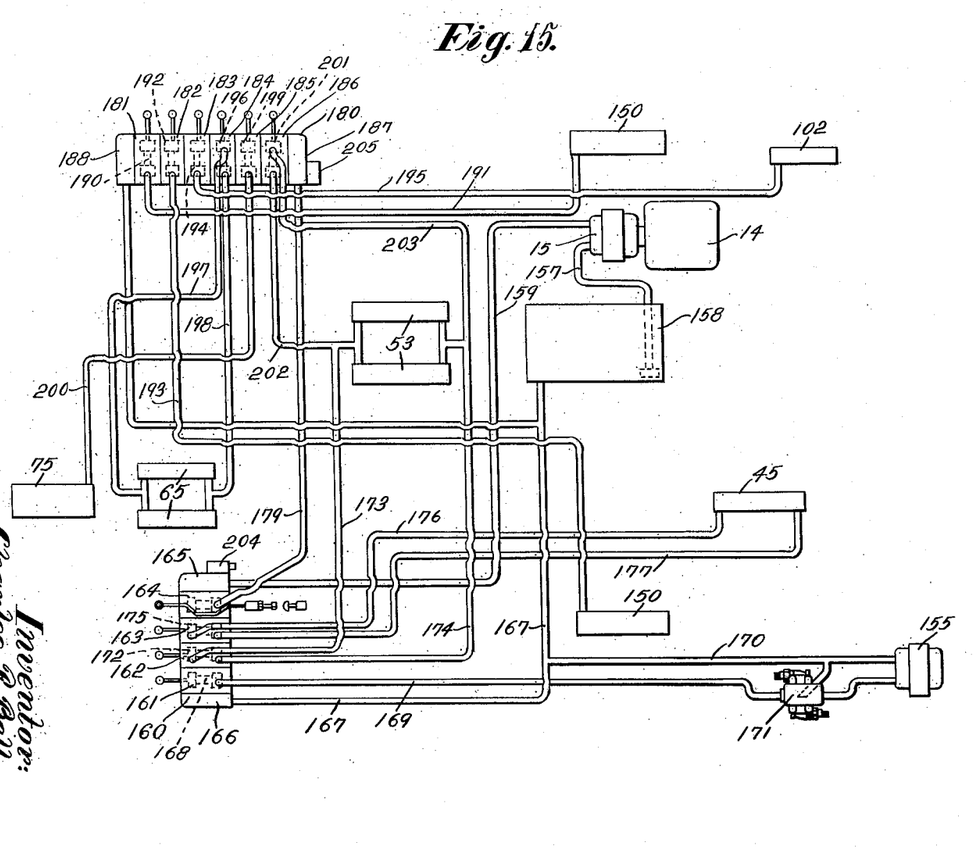
Fig. 15 is a diagrammatic view illustrating the hydraulic system and associated control valve means.

The hydraulic system and associated control valve means, as shown diagrammatically in Fig. 15, includes the pump 15 driven by the motor 14. The pump has its suction side connected by a conduit 157 to a liquid tank 158 carried by the base, and the discharge side of the pump is connected by a conduit 159 to the pressure passage of a valve box 160 of a conventional valve mechanism of the balanced sliding spool type. This valve box is made up of valve block sections 161, 162, 163, and 164 and inlet and discharge end sections 165 and 166, and the valve blocks and end sections are suitably maintained in assembled relation. The conduit 159 is connected to the chamber of the inlet section 165 and the chamber of the discharge section 166 is connected by a return conduit 167 back to the tank. The valve box 160 is arranged on the base of the machine near the operator's station S on the machine, as shown in Fig. 1. The valve block 161 has a bore containing a slide valve 168 and the bore is connected by a conduit 169 to the reel motor 155, and the discharge side of the reel motor is connected by a conduit 170 to the return conduit 167. A control valve device 171 connected between the conduits 169 and 170 serves to maintain predetermined reduced pressures within the reel motor and for controlling reel operation as disclosed in a copending application of C. F. Ball et al. Serial No. 731,126 filed February 2, 1947. The bore of the valve block 162 contains a slide valve 172 and the bore is connected by conduits 173 and 174 to the opposite ends of the swing cylinders 53 for the turntable 6 on which the elevator boom is mounted.

The bore of the valve block 163 contains a slide valve 175, and the bore is connected by conduits 176 and 177 to the opposite ends of the steering cylinder 45 for the rear wheels 5. The bore of the valve block 164 contains a slide valve known as a diverting valve and the bore is connected by a conduit 179 to the pressure passage of a valve box 180 of a conventional balanced spool type slide valve mechanism. This valve box is arranged at the side of the base as shown in Fig. 1 so that the operator may conveniently control the machine during the drilling and timber setting operations while standing at one side of the machine. The valve box 180 is made up of valve block sections 181, 182, 183, 184, 185 and 186 and inlet and discharge end sections 187 and 188, and these sections are suitably held is assembled relation. The conduit 179 is connected to the chamber of the inlet section 187, and the chamber of the end section 188 is connected by a conduit 189 to the discharge conduit 167. The bore of the valve block 181 contains a slide valve 190 and the bore is connected by a conduit 191 to the cylinder 150 of one of the floor jacks 13. The bore of the valve block 182 contains a slide valve 192 and the bore is connected by a conduit 193 to the cylinder 150 of the other floor jack 13. The bore of the valve block 183 contains a slide valve 194 and the bore is connected by a conduit 195 to the cylinder 102 of the timber lifting device 10. The bore of the valve block 184 contains a slide valve 196 and the bore is connected by conduits 197 and 198 to the feed cylinders 65 for the sliding support 7. The bore of the valve block 185 contains a slide valve 199 and the bore is connected by a conduit 200 to the cylinder 75 for lifting the elevator boom 8. The valve block 186 contains a slide valve 201 and the bore is connected by conduits 202 and 203 also connected to the opposite ends of the swing cylinders 53 for the turntable. Thus the valves 172 and 201 provide a dual control for the swing cylinders 53. The valve boxes 160 and 180 are provided with usual relief valves 204 and 205 associated with the pressure passages for relieving the pressure in the system when such pressure becomes excessive. Also by the provision of the two valve boxes the operator may control the machine from two different stations, the one station S being on the machine to provide control during tramming and the other station being at the side of the machine with the operator standing on the floor to provide control during the drilling and timber setting operations. When the operator is at his station S on the machine the diverting valve 178 is positioned to cut off flow of liquid under pressure to the valve box 180, and when the operator leaves his station on the machine he shifts the diverting valve 178 to supply liquid under pressure to the valve box 180, so that he can thereafter control the machine from a standing position at the side of the machine. Associated with the lifting cylinder 75 for the elevator boom 8 is a suitable safety control which avoids inadvertent dropping of the elevator boom, and such safety control may be similar to that disclosed in a copending application to one John D. Russell Ser. No. 33,890, filed June 18, 1948, now matured into Patent No. 2,570,383, patented October 9, 1951.

The general mode of operation of the improved timber setting machine is as follows: a load of mine timbering elements such as cross timbers T is placed on the deck 92 of the machine with the timbering elements arranged, as shown in Figs. 6 and 7. The machine may be propelled about the mine or tunnel by the front crawler treads 20 driven by the motors 16, and these motors may be operated under the control of the control apparatus at relatively different speeds to effect steering of the machine in a well known manner. Optional steering is afforded by the rear wheels 5 under the control of the slide valve 175 for the hydraulic cylinder 45 and in conjunction with the crawler treads to enable the machine to be sharply turned, and under certain conditions the rear wheels 5 may be swung into parallelism with the crawler treads at a substantial angle to effect lateral movement of the machine in a diagonal direction with respect to the longitudinal dimension of the base. This latter function is particularly desirable when the machine is to be positioned close to the ribs. Normally, however, the rear wheels 5 are locked by liquid trapped in the cylinder 45 in parallelism with the longitudinal dimension of the base and steering is effected solely by the crawler treads.

Figure 2:
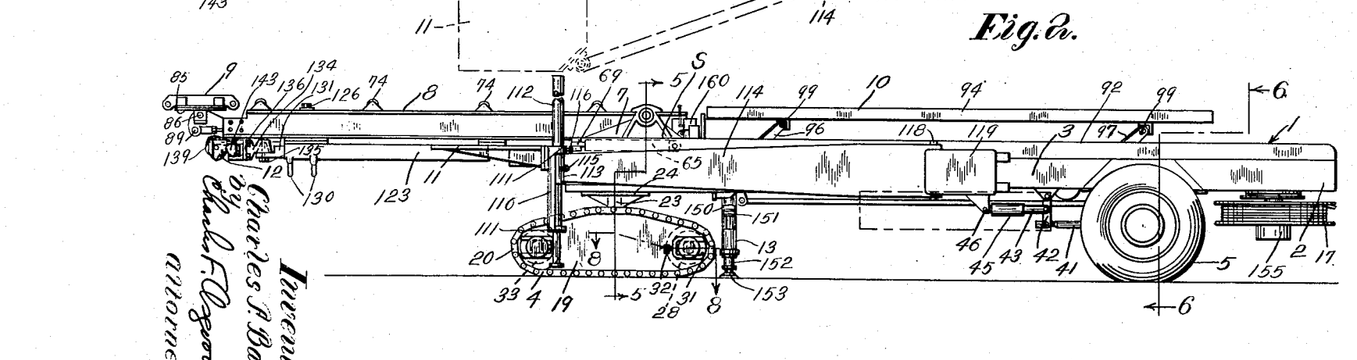
Fig. 2 is a side elevational view of the machine shown in Fig. 1.

When the timber setting machine is suitably positioned with respect to the work, and it is desired to set a cross timber against the roof, the floor jacks 13 are lowered into the vertical position shown in Figs. 1 and 2 and moved into engagement with the floor to hold the machine steady during the drilling and timber setting operations, and the elevator boom 8 is positioned, as shown in Figs. 1 and 2, and the timber lifting device 10 is at that time in its lowered position substantially flush with the deck. An adjacent timber is then moved laterally onto the guide rollers 95 of the upper lifting frame 94, as shown at T in dotted lines in Figs. 6 and 7, and liquid under pressure may then be supplied to the cylinder 102 under the control of the slide valve 194 to effect lifting of the timber into a position wherein it may be moved endwise along the guide rollers 95 and the guide rollers 74 on the elevator boom 8 onto the supporting platform 90 of the saddle 9. When the timber is properly positioned on the saddle liquid under pressure may be supplied to the cylinder 75 under the control of the slide valve 199 to effect swinging of the elevator boom 8 upwardly a slight distance about its pivot so that the mine timber can be turned horizontally with the saddle platform into a right angle position crosswise of the elevator boom. Liquid under pressure may then be supplied to the cylinder 75 to effect swinging of the elevator boom upwardly to bring the cross timber against the roof and to hold the timber in position during setting of the uprights or props. When the cross timbers are to be set in position by rib pinnings, the drilling tool 139 may be properly positioned by suitably locating the elevator boom 8 and adjusting the swivelled drill mounting, and the pin holes may then be drilled in the ribs just below the roof level. When the cross timber is positioned and held against the roof by the elevator boom, the rib pins are suitably driven in place in the pin holes to secure the timber in place. As the elevator boom is swung upwardly to move the cross timber toward the roof, the sliding support 7 may be shifted rectilinearly in a horizontal direction by the hydraulic cyinders 65 under the control of the slide valve 196 so that the cross timber may be properly located as it is placed against the roof. Also, liquid under pressure may be supplied to the hydraulic cylinders 53 under the control of the slide valve 201 to turn the turntable 6 to locate the elevator saddle in the desired position laterally with respect to the base. During the drilling operation and the setting of the rib pins, the platforms 11 may be moved longitudinally, swung laterally and raised or lowered into the desired positions with respect to the base so that the workmen operating the drill and setting the rib pins may stand on the platforms in convenient positions.

Figure 16:
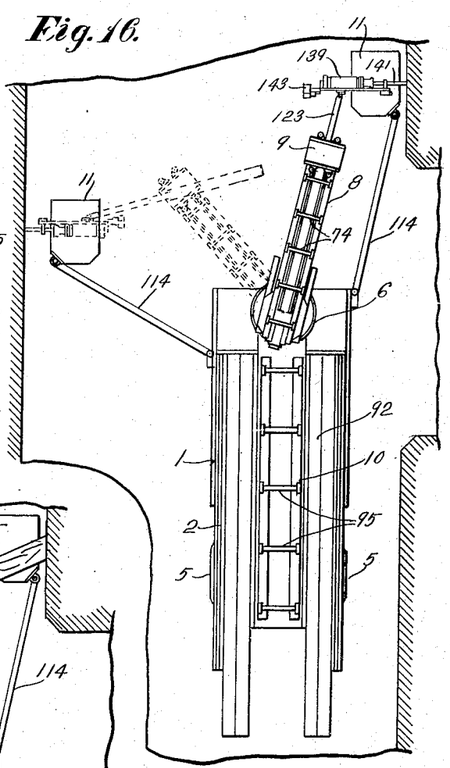
Figs. 16, 17, 18 and 19 are diagrammatic plan views showing the timber setting machine in several of its different operating positions in a mine or tunnel.
Figure 17:
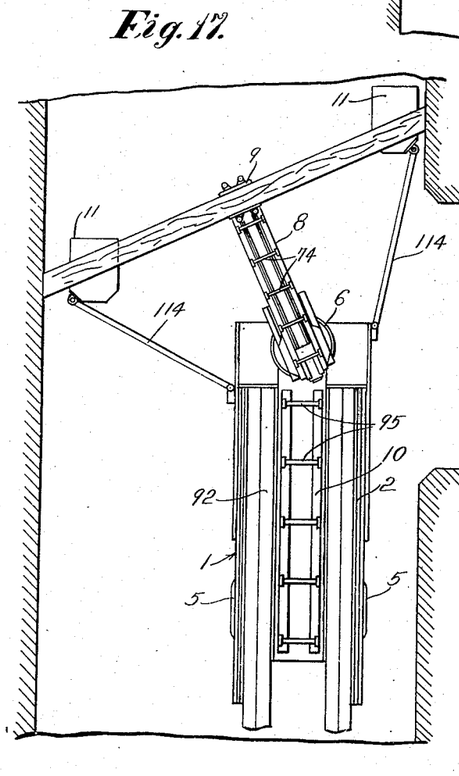

When it is desired to set a cross timber diagonally against the roof across the entry, as shown in Fig. 17, the timber setting machine is located in the position shown in Fig. 16. The clamp 128 of the drilling apparatus may then be released and the guide tube 127 may be slid axially outwardly with respect to the tubular guiding support 123 to locate the drilling tool 139 in advance of the elevator boom near the right hand rib, as shown. The right hand platform 11 is at that time located near the right hand rib so that the drill operator may assume an advantageous position during the drilling of the holes for the rib pins. When the drilling of the right hand rib is completed, the elevator boom 8 is swung toward the left to the position indicated in dotted lines in Fig. 16, and the clamp 146 is loosened so that the guide support 123 may be swung laterally about the swivel 122 with respect to the elevator boom in the position shown at the opposite side of the boom. The swivel clamp 132, 133 is then adjusted to lock the drilling tool 139, as shown at the left in Fig. 16, and pin holes may then be drilled in the left hand rib. The left hand platform 11, during this latter drilling operation, is located laterally close to the left hand rib, as shown in Fig. 16. The elevator boom 8 may then be swung into alinement with the base, as shown in Fig. 1 and lowered into a horizontal position as shown in Fig. 2 so that a cross timber may be rolled out endwise along the elevator onto the saddle 9. The elevator boom may then be swung into the lateral position shown in Fig. 17 and the timber may then be positioned diagonally, as shown, and raised into the position against the roof and set in place by the rib pins.

Figure 18:
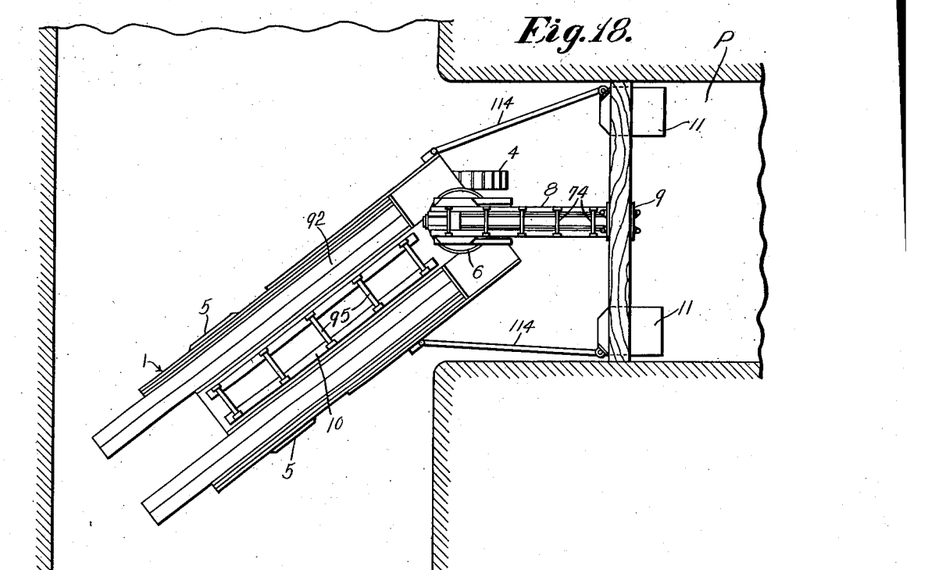
Figure 19:
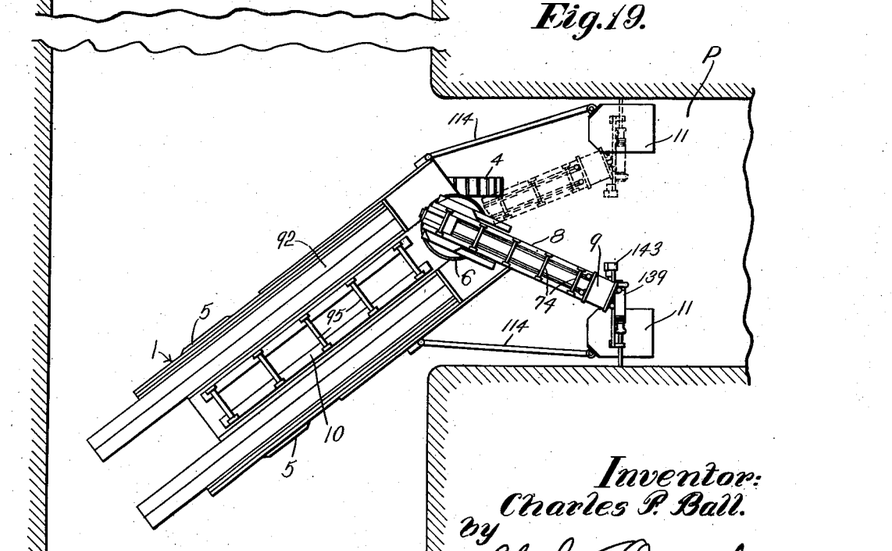

In Figs. 18 and 19 the timber setting machine is shown in a position for setting cross timbers against the roof in a passageway P, such as a cross cut or room neck, extending laterally from the main entry. During this operation, the machine is angularly positioned in the entry, as shown, and the elevator boom 8 is positioned first as shown in full lines in Fig. 19 to support the drilling tool 139 in position to drill the holes for the rib pins in the right hand wall of the passageway. The drilling tool may thereafter be swivelled on its adjustable mounting into its opposite position at the opposite side of the boom and the elevator boom may be swung laterally, as shown in dotted lines in Fig. 19, and the pin holes may be drilled in the opposite wall. The elevator boom is then lowered into a horizontal position in alinement with the base and a timber is elevated by the lifting device 10 and moved endwise onto the timber saddle, and when properly positioned is moved up against the roof and set in place by the rib pins, as shown in Fig. 18. The platforms 11 for the workmen are positioned during these drilling and timber setting operations, as shown in Figs. 18 and 19 by suitably adjusting the supporting arms 114 with respect to the base of the machine. Various other manners of use of the machine will be clearly apparent to those skilled in the art.

As a result of this invention, an improved timber setting machine is provided which serves to transport the roof timbering elements about the mine or tunnel and embodies drilling apparatus for drilling the pin holes in the ribs and mechanical elevator apparatus for raising the timbers against the roof and for holding the timbers in position during the securing of the rib pins in the ribs. By the provision of the mechanical lifting device embodied in the machine, the timbers may be lifted from the deck level into a position to be received on the saddle of the elevator boom, thereby minimizing the need of manually lifting the timbers. By associating the drilling apparatus with the elevator boom of the machine, and by adjustably mounting the drilling tool on the boom, the pin holes may be drilled in the ribs at any desired location. It will also be evident that by providing the platforms on the machine on which the workmen stand during the drilling and timber setting operations in the manner disclosed, the use of the machine is greatly facilitated. By the provision of a timber setting machine of the design disclosed not only may the cross timbers be quickly set in place against the mine roof, but also the need of manually handling the mine timbers is substantially reduced. The novel crawler tread mounting and the associated steering wheels render the steering of the machine extremely flexible even while the machine is traversing an uneven floor surface, and by associating the steering wheels with the crawler treads the machine may be sharply turned and positioned laterally relatively close to either rib. The novel control means for the various hydraulically operated devices of the machine enables the operator to control the machine at a station on the machine or at a station at one side of the machine, thereby greatly increasing the flexibility of control. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a timber setting machine, a mobile base, an elevator boom pivotally mounted on said base to swing in vertical planes with respect thereto, a timber receiving saddle carried by said boom at the outer extremity of the latter, said boom being swingable about its pivot into a horizontal lowered position to locate said saddle in a timber receiving position, and a timber receiving device arranged lengthwise of said base and including an upper horizontal carrier frame disposable in a lowered position a substantial distance below said horizontal boom to receive a timber, said base providing a space extending longitudinally thereof for receiving said carrier frame when the latter is in its horizontal lowered position, and means for elevating said carrier frame into a position in longitudinal alinement with said horizontal elevator boom to position a timber carried by said carrier frame so that it may be moved endwise along said carrier frame and longitudinally along said boom onto said saddle without bodily lifting of the timber.

2. In a timber setting machine, a mobile base having an upper deck adapted to receive a load of roof timbers, an elevator boom pivotally mounted at one end of said base, a timber receiving saddle carried by said boom, said boom being swingable about its pivot into a horizontal lowered position to locate said saddle in a timber receiving position, said saddle when said boom is in its lowered position being disposed a substantial distance above the top of said deck, and a timber lifting device arranged lengthwise of said base and having an upper horizontal carrier frame disposable when lowered with its upper surface at the level of said deck to receive a timber from said deck, said base providing a space extending longitudinally thereof for receiving said carrier frame when the latter is in its lowered horizontal position, and devices for elevating said carrier frame a substantial distance above said deck into a position in longitudinal alinement with said horizontal boom to position a timber on said carrier frame so that it may be moved endwise therealong and longitudinally along said horizontal boom onto said saddle without bodily lifting of the timber.

3. In a timber setting machine, a mobile base, a horizontal turntable mounted on said base and having horizontal guideways thereon, a horizontal support slidably guided on said guideways for rectilinear movement in a horizontal direction with respect to said turntable, fluid cylinders arranged on said turntable in parallelism with said guideways and spaced equidistantly from the turntable axis, said fluid cylinders operatively connected between said turntable and said sliding support for sliding the latter back and forth along said guideways, an elevator boom pivotally mounted on said sliding support to swing in vertical planes with respect thereto and carrying a timber receiving saddle, a fluid cylinder device arranged on said sliding support centrally intermediate said parallel cylinders and operatively connected to said boom in adjacency to its pivot for swinging said boom upwardly about its pivot to elevate said saddle, said boom having side projections extending downwardly into the spaces between the parallel and central cylinder devices and to which said central cylinder device is operatively connected, and operative connections between said central cylinder device and said side projections.

4. In a timber setting machine, a mobile base, a horizontal turntable mounted on said base and having spaced parallel horizontal guideways thereon, a horizontal support slidably guided on said guideways for rectilinear movement in a horizontal direction with respect to said turntable, parallel fluid cylinder devices arranged on said turntable longitudinally in parallelism with and in adjacency to said guideways, said cylinder devices operatively connected between said turntable and said sliding support for sliding the latter back and forth along said guideways, an elevator boom pivotally mounted on said sliding support to swing in vertical planes with respect thereto, a timber receiving saddle carried by said boom, a fluid cylinder device arranged on said sliding support centrally intermediate said parallel cylinder devices and operatively connected to said boom for swinging the latter upwardly about its pivot to elevate said saddle, said central cylinder device comprising a reciprocable piston having a piston rod, and transmission connections between said piston and said boom including an equalizer yoke pivotally connected midway between its ends to said piston rod and flexible transmission elements connected between the ends of said yoke and the sides of the rearward end of said boom, said boom having side projections extending downwardly into the spaces between said parallel cylinder devices and said central cylinder device at the inner sides of said guideways and with which said flexible elements respectively cooperate, the points of connection of said flexible elements with said boom being located in all positions of said boom about its pivot below a horizontal plane including the boom pivot axis.

5. In a timber setting machine, a mobile base, a horizontal turntable mounted on said base and having horizontal guideways thereon, a horizontal support slidably guided on said guideways for rectilinear movement in a horizontal direction with respect to said turntable, fluid cylinders arranged on said turntable in parallelism with said guideways and operatively connected between said turntable and said sliding support for sliding the latter back and forth along said guideways, an elevator boom pivotally mounted on said sliding support to swing in vertical planes with respect thereto and carrying a timber receiving saddle, a fluid cylinder device arranged on said sliding support centrally intermediate said parallel cylinders and operatively connected to said boom for swinging the latter upwardly about its pivot to elevate said saddle, said cylinder device comprising a reciprocable piston having a piston rod, and transmission connections between said piston and said boom including an equalizer yoke pivotally connected midway between its ends to said piston rod and flexible transmission elements connected between the ends of said yoke and the sides of the rearward end of said boom, and said boom having arcuate guide segments projecting downwardly from its sides with the curved surfaces of which said flexible elements have guided contact.

6. In a timber setting machine, a mobile base, a timber elevator mounted on said base for adjustment in vertical planes with respect thereto and carrying a timber receiving saddle, said elevator being adjustable upwardly to elevate said saddle to bring a timber thereon up against the roof and to hold it there during setting of the timber, platforms adjustably mounted on said base for movements bodily laterally and longitudinally with respect to said base and disposable in advance of said base and a substantial distance below the top of the latter in positions at the sides of the ribs near the ends of the timber and on which the workmen may stand during setting of the timber, and means for adjustably mounting said platforms for adjustments as aforesaid relative to said base.

7. In a timber setting machine, a mobile base, a timber elevator mounted on said base for adjustment in vertical planes with respect thereto and carrying a timber receiving saddle, said elevator being adjustable upwardly to elevate said saddle to bring a timber thereon up against the roof and to hold it there during setting of the timber, platforms adjustably mounted on said base for movements bodily laterally and longitudinally with respect to said base and disposable in advance of said base and a substantial distance below the top of the latter in positions at the sides of the ribs near the ends of the timber and on which the workmen may stand during setting of the timber, and means for adjustably mounting said platforms for adjustment as aforesaid relative to said base, said platforms being independently adjustable and their mountings including elongated horizontal supports mounted at the sides of said base for movement laterally and longitudinally relative thereto, said supports respectively carrying said platforms at their outer ends.

8. In a timber setting machine, a mobile base, a timber elevator mounted on said base for adjustment in vertical planes with respect thereto and carrying a timber receiving saddle, said elevator being adjustable upwardly to elevate said saddle to bring a timber thereon up against the roof and to hold it there during setting of the timber, and platforms adjustably mounted on said base for movements bodily laterally and longitudinally with respect to said base and disposable in positions at the sides of the ribs near the ends of the timber and on which the workmen may stand during setting of the timber, said platforms being independently adjustable and their mountings including elongated horizontal supports by which said platforms are respectively carried and sliding mountings guided along the sides of said base and on which the rear ends of said elongated supports are pivotally supported.

9. In a timber setting machine, a mobile base, a timber elevator mounted on said base for adjustment in vertical planes with respect thereto and carrying a timber receiving saddle, said elevator being adjustable upwardly to elevate said saddle to bring a timber thereon up against the roof and to hold it there during setting of the timber, and platforms adjustably mounted on said base for movements bodily laterally and longitudinally with respect to said base and disposable in positions at the sides of the ribs near the ends of the timber and on which the workmen may stand during setting of the timber, said platforms being independently adjustable and their mountings including elongated horizontal supports by which said platforms are respectively carried and sliding mountings guided along the sides of said base and on which said elongated supports are pivotally supported for lateral swinging movement, said elongated supports carrying at their outer ends near said platforms upright posts adjustable vertically into engagement with the floor to steady said platforms when in adjusted positions.

10. In a timber setting machine, a mobile base, a timber elevator mounted on said base for adjustment in vertical planes with respect thereto and carrying a timber receiving saddle, said elevator being adjustable upwardly to elevate said saddle to bring a timber thereon up against the roof and to hold it there during setting of the timber, and platforms adjustably mounted on said base for movements bodily laterally and longitudinally with respect to said base and disposable in positions at the sides of the ribs near the ends of the timber and on which the workmen may stand during setting of the timber, said platforms being independently adjustable and their mountings including elongated horizontal supports by which said platforms are respectively supported and sliding mountings guided along the sides of said base and on which said elongated supports are pivotally supported, said elongated supports carrying at their outer ends near said platforms upright posts adjustable vertically into engagement with the floor to steady said platforms, and said adjustable mounting means including means for adjustably securing said platforms to said posts in different elevated positions relative to said horizontal supports.

11. In a timber setting machine, a mobile base, a timber elevator mounted on said base for adjustment in vertical planes with respect thereto and carrying a timber receiving saddle, said elevator being adjustable upwardly to elevate said saddle to bring a timber thereon up against the roof and to hold it there during setting of the timber, and platforms adjustably mounted on said base for movements bodily laterally and longitudinally with respect to said base and disposable in positions at the sides of the ribs near the ends of the timber and on which the workmen may stand during setting of the timber, said platforms being independently adjustable and their mountings including elongated horizontal supports by which said platforms are respectively supported and sliding mountings guided along the sides of said base and on which said elongated supports are pivotally supported, said elongated supports carrying at their outer ends near said platforms upright posts adjustable vertically into engagement with the floor to steady said platforms, and said adjustable mounting means including means for adjustably securing said platforms to said posts in different elevated positions with respect to said elongated supports and means for swively mounting said platforms on said posts to swing horizontally with respect thereto.

12. In a timber setting machine, a mobile base providing an upper horizontal deck for receiving a load of roof timbers, a timber receiving saddle, means on said base for elevating said saddle to bring a timber thereon up against the roof, said saddle when lowered by said elevating means being disposed a substantial distance above said deck, and a timber lifting device mounted on said base centrally between the sides of the latter and spaced longitudinally of said base from said saddle elevating means, said lifting device disposed when lowered with its top surface horizontal and substantially at the level of said deck for receiving a timber from said deck at the deck level thereby to eliminate bodily manual lifting of the timber, said base providing a recess extending longitudinally thereof for receiving said lifting device when the latter is in its lowered horizontal position, and means for elevating said device upwardly from said recess and above said deck to a horizontal elevated position in longitudinal alignment with said saddle to bring a timber on said device into a position with respect to said saddle whereby the timber may be moved endwise from said device onto said saddle without bodily manual lifting of the timber.

13. In a timber setting machine, a mobile base providing an upper deck for receiving a load of roof timbers, a timber receiving saddle, means on said base for elevating said saddle to bring a timber thereon up against the roof, said saddle when lowered by said elevating means being disposed a substantial distance above said deck, and a timber lifting device mounted on said base and disposable when lowered with its top surface substantially flush with said deck for receiving a timber from said deck, said deck being recessed to receive said device when the latter is lowered, and means for elevating said device to bring a timber thereon into a position wherein the timber may be moved endwise from said device onto said saddle.

14. In a timber setting machine, the combination with a base and a timber receiving saddle carried by said base above the latter, of a timber lifting device for raising a timber from a relatively low position relative to said base into an elevated position above said base wherein the timber may be moved endwise onto said saddle, said timber lifting device comprising an upper horizontal carrier frame having transverse rollers mounted thereon for receiving and supporting a timber, said base having a longitudinal recess for receiving said carrier frame when the latter is in its lowered timber receiving position with respect to said base, pairs of front and rear bell crank arms located below said carrier frame within said base-recess and having portions projecting below said recess, said bell crank arms pivotally mounted on said base and pivotally connected to said carrier frame for supporting the latter in different elevated positions while maintaining the same in horizontal planes, a rod pivotally connected to said projecting portions of said arms below said recess for causing swinging movement thereof in unison, a fluid cylinder pivotally mounted on said base below said recess, a piston reciprocable in said cylinder and having its piston rod pivotally connected to the rear pair of arms, and means for controlling fluid flow with respect to said cylinder to cause piston movement to effect swinging of said arms to raise or lower said horizontal carrier through an arcuate path to position the latter above said base in substantial longitudinal alignment with said saddle whereby a timber may be moved endwise from said carrier frame onto said saddle.

15. In a timber setting machine, a mobile base having a horizontal platform adapted to receive a load of timbers, said platform having a relatively narrow longitudinal recess arranged centrally between the sides thereof, and a timber lifting device including an upper, relatively narrow elongated horizontal carrier frame disposable when in lowered position within said recess with its top surface substantially flush with said platform for receiving a timber moved laterally from said platform without bodily lifting of the timber, a parallel motion arm mechanism arranged in said recess between said carrier frame and said base for supporting and lifting said carrier frame while maintaining the same in horizontal planes, and a power device on said base below said recess for swinging said arm mechanism to elevate said carrier frame to bring a timber thereon into an elevated position a substantial distance above said platform.

16. In a timber setting machine, a mobile base, a turntable on said base, a timber elevator mounted on said turntable and carrying a timber receiving saddle, a fluid operated device for rotating said turntable to change the lateral position of said elevator both during the timber setting operation and tramming of the machine about the mine, a fluid system including a fluid pump, and a pair of control valve mechanisms associated with said fluid system and having identical fluid controlling functions, said valve mechanisms located at widely spaced points on said base whereby the operator may control operation of said fluid operated device while assuming widely spaced different stations with respect to the machine, and one of said valve mechanisms including a diverting valve for diverting the fluid in the system from one valve mechanism to said other valve mechanism when the operator changes his station with respect to the machine.

17. In a timber setting machine, a mobile base, mechanism carried by said base for effecting timber setting operations, platforms adjustably mounted on said base beyond one end of said base and disposable below the top of the latter for movement into horizontal positions laterally and longitudinally relative to said base and including lateral positions at the sides of the ribs near the ends of the timber to be set and on which the workman may stand during said timber setting operations, and means for mounting said platforms on said base for adjustments as aforesaid relative thereto.

18. In a timber setting machine, a mobile base, mechanism carried by said base for effecting timber setting operations, platforms adjustably mounted on said base beyond one end and below the top of the latter and disposable in different lateral positions at the sides of the ribs near the ends of the timber to be set and on which the workman may stand during setting of the timber, and means for mounting said platforms on said base for adjustment as aforesaid relative thereto, said platforms being independently horizontally adjustable laterally relative to said base and their mountings including elongated horizontal supports mounted for lateral adjustment at the sides of said base, said platforms respectively carried at the outer extremities of said horizontal supports.

19. In a timber setting machine, a mobile base, mechanism carried by said base for effecting timber setting operations, platforms adjustably mounted on said base and disposable in different lateral positions at the sides of the ribs near the ends of the timber to be set and on which the workmen may stand during setting of the timber, and means for mounting said platforms on the sides of said base, below the top of the latter, said platforms being independently horizontally adjustable laterally relative to said base beyond the sides of the latter and their mountings including elongated horizontal supports by which said platforms are respectively carried, and mounting members also movable longitudinally along the sides of said base and on which said elongated supports are respectively pivotally supported.

20. In a timber setting machine, a mobile base, a timber elevator mounted on said base for adjustment in vertical planes with respect thereto and carrying a timber receiving saddle, a horizontal platform on said base for receiving a load of mine timbers with certain of said timbers disposed in piled up relation one on top of another, said saddle when said elevator is in its lowered horizontal position disposed a substantial distance above the level of said platform, and a timber lifting device mounted on said base centrally between the sides of the latter and disposable horizontally in positions at different elevations with respect to said platform including a lowered position at the level of said platform to receive timbers piled at different heights, said base providing a longitudinal recess for receiving said device when the latter is lowered, and means for elevating said device above said platform to the level of said lowered saddle to bring a timber on said device into a position wherein the timber may be moved endwise from said device onto said saddle without bodily manual lifting of the timber.

21. In a timber setting machine, the combination comprising a base, a timber receiving saddle carried by said base above the latter, and a timber lifting device disposed centrally between the sides of said base and spaced longitudinally of said base from said saddle, said lifting device comprising an upper horizontal carrier frame for elevating a timber thereon from a low position on said base to a raised position above said base wherein the timber may be moved endwise from said carrier frame onto said saddle without bodily manual lifting of the timber, said carrier frame having a series of spaced transverse rollers mounted thereon for receiving and supporting a timber, pairs of front and rear bell crank arms pivotally mounted on said base to swing in vertical planes and pivotally connected to said carrier frame near the ends of the latter for supporting the latter for movement into different elevated positions while maintaining the same in horizontal planes, and an extensible power device operatively connected between certain of said arms and said base for effecting swinging movement of said arms in unison to raise and lower said carrier frame along an arcuate path, said carrier frame as it moves arcuately upwardly toward its elevated position at one end approaching said saddle.

22. In a machine of the character described, a mobile base, platforms adjustably mounted on said base at one end and below the top of the latter, and means for independently adjustably supporting said platforms on said base into different lateral and longitudinal horizontal positions with respect to said base including laterally swingable horizontal arms by which said platforms are respectively carried and mounting members adjustably longitudinally of said base and on which said arms are respectively pivotally supported, said arms being swingable horizontally into different angular positions to locate said platforms at different distances beyond the sides of said base.

23. A timber setting machine as set forth in claim 4 wherein said boom is pivotally supported by spaced bearing elements located above said parallel cylinder devices and said flexible transmission elements extend longitudinally and downwardly in the spaces intermediate said centrally located swing cylinder device and said parallel fluid cylinder devices at the inner sides of said guideways and are connected to said side projections at the rearward end of said boom at laterally spaced points intermediate said bearing elements.

24. A timber setting machine as set forth in claim 5 wherein arcuate guide segments are located in the spaces between said centrally located cylinder device and said parallel fluid cylinder devices at the inner sides of said guideways, and said flexible elements extend longitudinally in spaced relation within said spaces and downwardly and rearwardly along said curved surfaces of said guide segments.

25. A timber setting machine as set forth in claim 7 wherein said platforms are pivotally mounted near one edge thereof at the outer extremity of said horizontal supports to swing horizontally into different angular positions with respect thereto.

26. A timber setting machine as set forth in claim 9 wherein said platforms are pivotally mounted at the outer extremities of said horizontal supports to swing horizontally into different lateral positions relative thereto about pivots coaxial with said vertically adjustable posts.

27. In a timber setting machine, the combination comprising a mobile support, a horizontal turntable rotatably mounted on said base to turn about an upright axis, an elevator boom pivotally mounted on said turntable to swing in vertical planes with respect thereto about a horizontal axis located above said turntable, said elevator boom carrying a timber receiving saddle at its outer extremity, power operated devices mounted on said turntable beneath said boom pivot and connected to the rear end of said boom for swinging the latter upwardly about its pivot to elevate said saddle, power operated turning means for said turntable for swinging said elevator boom about the turntable axis to locate said saddle in different lateral positions comprising power operated devices connected to the lower portion of said turntable beneath said boom swinging devices, said turntable carrying parallel horizontal guides disposed below said connection of said turning means with said turntable, a support slidably mounted on said guides and on which said boom is pivotally mounted, said power operated boom swinging devices being carried by said sliding support, and power operated devices connected between said turntable and said sliding support and located above said guides for moving said latter support back and forth along said guides relative to said turntable.

28. In a timber setting machine, a mobile base, a horizontal turntable mounted on said base, parallel horizontal guideways mounted on said turntable at the sides thereof and spaced equidistantly from the center of the turntable, a horizontal support guided for horizontal rectilinear movement along said guideway, an elevator boom pivotally mounted on said support on a horizontal transverse axis disposed at the top of said support, said boom being swingable about its pivot into a horizontal position and carrying a timber receiving saddle at its outer extremity, horizontally disposed extensible fluid devices arranged in parallelism at the tops of said guideways and operatively connected between said turntable and said support for moving the latter back and forth along its guideways, and a horizontally disposed extensible fluid device arranged on said support beneath said boom pivot centrally between said parallel fluid devices and operatively connected to said boom for swinging the latter.

CHARLES F. BALL.

References Cited in the file of this patent

UNITED STATES PATENTS

| Number | Name | Date |
| --- | --- | --- |
| Re. 8,758 | Hayes et al. | June 17, 1879 |
| 180,845 | Cliff | Aug. 8, 1876 |
| 717,820 | Cunningham | Jan. 6, 1903 |
| 874,008 | Holt | Dec. 17, 1907 |
| 972,455 | Kendrick | Oct. 11, 1910 |
| 1,382,328 | Stone | June 21, 1921 |
| 1,418,003 | Ladd | May 30, 1922 |
| 1,755,738 | Klepadlo et al. | Apr. 22, 1930 |
| 2,092,607 | Johnston | Sept. 7, 1937 |
| 2,144,627 | Holmes | Jan. 24, 1939 |
| 2,217,674 | Curtis | Oct. 15, 1940 |
| 2,365,168 | Billings | Dec. 19, 1944 |
| 2,387,568 | Drott et al. | Oct. 23, 1945 |
| 2,408,387 | Gay et al. | Oct. 1, 1946 |
| 2,413,096 | Barker | Dec. 24, 1946 |
| 2,446,149 | Wells | July 27, 1948 |
| 2,450,812 | Ray | Oct. 5, 1948 |
| 2,456,056 | Fellay et al | Dec. 14, 1948 |
| 2,475,298 | Sloane | July 5, 1949 |
| 2,480,661 | Manning | Aug. 30, 1949 |
| 2,501,112 | Webster | Mar. 21, 1950 |
| 2,532,079 | Beltz | Nov. 28, 1950 |
| 2,597,086 | Morrow | May 20, 1952 |

FOREIGN PATENTS

| Number | Country | Date |
| --- | --- | --- |
| 608,834 | Great Britain | Sept. 21, 1948 |